(12) United States Patent
Qiu

(10) Patent No.: US 12,104,636 B2
(45) Date of Patent: Oct. 1, 2024

(54) QUICK RELEASE AND QUICK INSTALLATION NUT

(71) Applicant: HARDA (XIAMEN) PLASTIC CO., LTD., Xiamen (CN)

(72) Inventor: Yulin Qiu, Xiamen (CN)

( * ) Notice: Subject to any disclaimer, the term of this patent is extended or adjusted under 35 U.S.C. 154(b) by 878 days.

(21) Appl. No.: 16/920,735

(22) Filed: Jul. 5, 2020

(65) Prior Publication Data

US 2021/0317863 A1    Oct. 14, 2021

(30) Foreign Application Priority Data

Apr. 9, 2020   (CN) .......................... 202020512908.1

(51) Int. Cl.
    *F16B 37/08*    (2006.01)

(52) U.S. Cl.
    CPC ................................ *F16B 37/0892* (2013.01)

(58) Field of Classification Search
    CPC .. F16B 21/06; F16B 37/0864; F16B 37/0842; F16B 37/0835; F16B 37/0885; F16B 37/0892; F16B 37/0855; E05D 1/04
    USPC .................... 16/356, 355; 411/433
    See application file for complete search history.

(56) References Cited

U.S. PATENT DOCUMENTS

| | | | | |
|---|---|---|---|---|
| 1,021,110 A | * | 3/1912 | Niewohner | F16B 39/16 411/255 |
| 1,099,224 A | * | 6/1914 | Wenslick | E21B 19/081 411/432 |
| 1,162,362 A | * | 11/1915 | Hyland | F16L 23/06 285/409 |
| 2,377,581 A | * | 6/1945 | Shaffrey | F16B 37/0892 411/433 |
| 4,609,217 A | * | 9/1986 | Nielsen, Jr. | F16B 41/007 292/307 B |
| 4,923,349 A | * | 5/1990 | Logsdon | F16B 37/0892 411/433 |
| 5,199,675 A | * | 4/1993 | DeGuchi | F16B 37/0885 248/62 |
| 6,460,901 B2 | * | 10/2002 | Rochelle | F16L 19/0231 285/415 |
| 7,735,667 B2 | * | 6/2010 | Schutz | F16L 19/0231 215/276 |
| 8,398,351 B2 | * | 3/2013 | Hohmann | B25B 29/02 411/432 |

(Continued)

FOREIGN PATENT DOCUMENTS

| | | | | |
|---|---|---|---|---|
| DE | 2437756 A1 | * | 6/1975 | .......... F16B 37/0885 |
| EP | 1777451 A2 | * | 4/2007 | .......... F16B 37/0885 |

(Continued)

*Primary Examiner* — William D Hutton, Jr.
*Assistant Examiner* — Dil K. Magar

(57) ABSTRACT

A quick-release and quick-installation nut includes a nut body. The nut body includes a first threaded block and a second threaded block. An inner wall of the first threaded block and an inner wall of the second threaded block are formed with inner threaded surfaces for cooperating with an outer threaded surface of a screw rod. A right end of the first threaded block is detachably connected to a right end of the second threaded block. A left end of the first threaded block is hingedly or detachably connected to a left end of the second threaded block. The nut can realize quick disassembly and installation with the screw rod.

3 Claims, 6 Drawing Sheets

(56) References Cited

U.S. PATENT DOCUMENTS

| 8,911,192 B2* | 12/2014 | Hohmann | F16B 37/0857 |
| | | | 411/433 |
| 2006/0039776 A1* | 2/2006 | Schutz | F16B 37/0892 |
| | | | 411/432 |
| 2019/0032822 A1* | 1/2019 | Vreugde | F16L 19/0231 |
| 2019/0071848 A1* | 3/2019 | Darocha | E03C 1/0401 |

FOREIGN PATENT DOCUMENTS

| EP | 2072842 A2 * | 6/2009 | F16B 37/0821 |
| GB | 855037 A * | 11/1960 | |
| JP | 2014020504 A * | 2/2014 | F16B 37/10 |
| WO | WO-2014108826 A1 * | 7/2014 | F16B 37/0885 |

* cited by examiner

QUICK RELEASE AND QUICK INSTALLATION NUT

BACKGROUND OF THE INVENTION

1. Field of the Invention

The present invention relates to a fastener, and more particularly to a quick-release and quick-installation nut.

2. Description of the Prior Art

A nut is a common fastener used to connect and fix a device. It is generally used in conjunction with a screw rod. Through the cooperation of the nut and the screw rod, a component or device is fastened. According to the needs of applications, nuts have various structures. When in use, a conventional nut is rotated from the end of a screw rod and slowly moved to the locking position for locking. It takes a long time for locking and cannot quickly install the nut and the screw rod. This is not beneficial for fast installation of nuts. Especially for the space where a faucet needs to be installed on the basin in the bathroom, if the nut and the screw rod are used for installing the faucet, it is quite inconvenient to install the faucet.

SUMMARY OF THE INVENTION

The primary object of the present invention is to provide a quick-release and quick-installation nut that can be quickly assembled to and disassembled from with a screw rod.

In order to achieve the above object, the present invention adopts the following technical solutions:

A quick-release and quick-installation nut used for cooperating with a screw rod comprises a nut body. The nut body includes a first threaded block and a second threaded block. An inner wall of the first threaded block and an inner wall of the second threaded block are formed with inner threaded surfaces for cooperating with an outer threaded surface of the screw rod. A right end of the first threaded block is detachably connected to a right end of the second threaded block. A left end of the first threaded block is hingedly or detachably connected to a left end of the second threaded block.

Preferably, the right end of the first threaded block is detachably connected to the right end of the second threaded block through a first connecting member. One of the right end of the first threaded block and the right end of the second threaded block is provided with a first connecting portion. The other of the right end of the first threaded block and the right end of the second threaded block is provided with a second connecting portion. Two ends of the first connecting member are provided with a first elastic claw portion a second elastic claw portion, respectively. The first elastic claw portion is configured to clasp the first connecting portion. The second elastic claw portion is configured to clasp the second connecting portion.

Preferably, the first elastic claw portion is rotatable to clasp the first connecting portion.

Preferably, one end of the second elastic claw portion of the first connecting member is provided with a first pull piece.

Preferably, the left end of the first threaded block is detachably connected to the left end of the second threaded block through a second connecting member. One of the left end of the first threaded block and the left end of the second threaded block is provided with a first coupling portion. The other of the left end of the first threaded block and the left end of the second threaded block is provided with a second coupling portion. Two ends of the second connecting member are provided with a first elastic hook portion and a second elastic hook portion, respectively. The first elastic hook portion is configured to clasp the first coupling portion. The second elastic hook portion is configured to clasp the second coupling portion.

Preferably, the second elastic hook portion is rotatable to clasp the second coupling portion.

Preferably, one end of the first elastic hook portion of the second connecting member is provided with a second pull piece.

Preferably, one of the first threaded block and the second threaded block is provided with a positioning post on an end portion thereof, and the other of the first threaded block and the second threaded block is provided with a positioning hole or a positioning groove on an end portion thereof for insertion of the positioning post.

After adopting the above technical solutions, the right end of the first threaded block is detachably connected to the right end of the second threaded block, and the left end of the first threaded block is hingedly or detachably connected to the left end of the second threaded block. It is easy to disassemble and assemble the first threaded block and the second threaded block of the nut body.

When the nut body of the present invention is to be installed to the screw rod, first, the first threaded block and the second threaded block of the nut body are separated. Then, the first threaded block and the second threaded block are moved to both sides of the screw rod to be locked. Next, the first threaded block and the second threaded block are connected, so that the inner threaded surfaces of the first threaded block and the second threaded block are engaged with the screw rod. At this time, as long as the nut body is slightly turned, the nut body and the screw rod can be locked. The installation is very convenient.

When disassembling the nut body and the screw rod, the nut body can be removed by separating the first threaded block and the second threaded block of the nut body. The disassembly is very convenient.

DETAILED DESCRIPTION OF THE PREFERRED EMBODIMENTS

Embodiments of the present invention will now be described, by way of example only, with reference to the accompanying drawings.

First Embodiment

Figure 1:
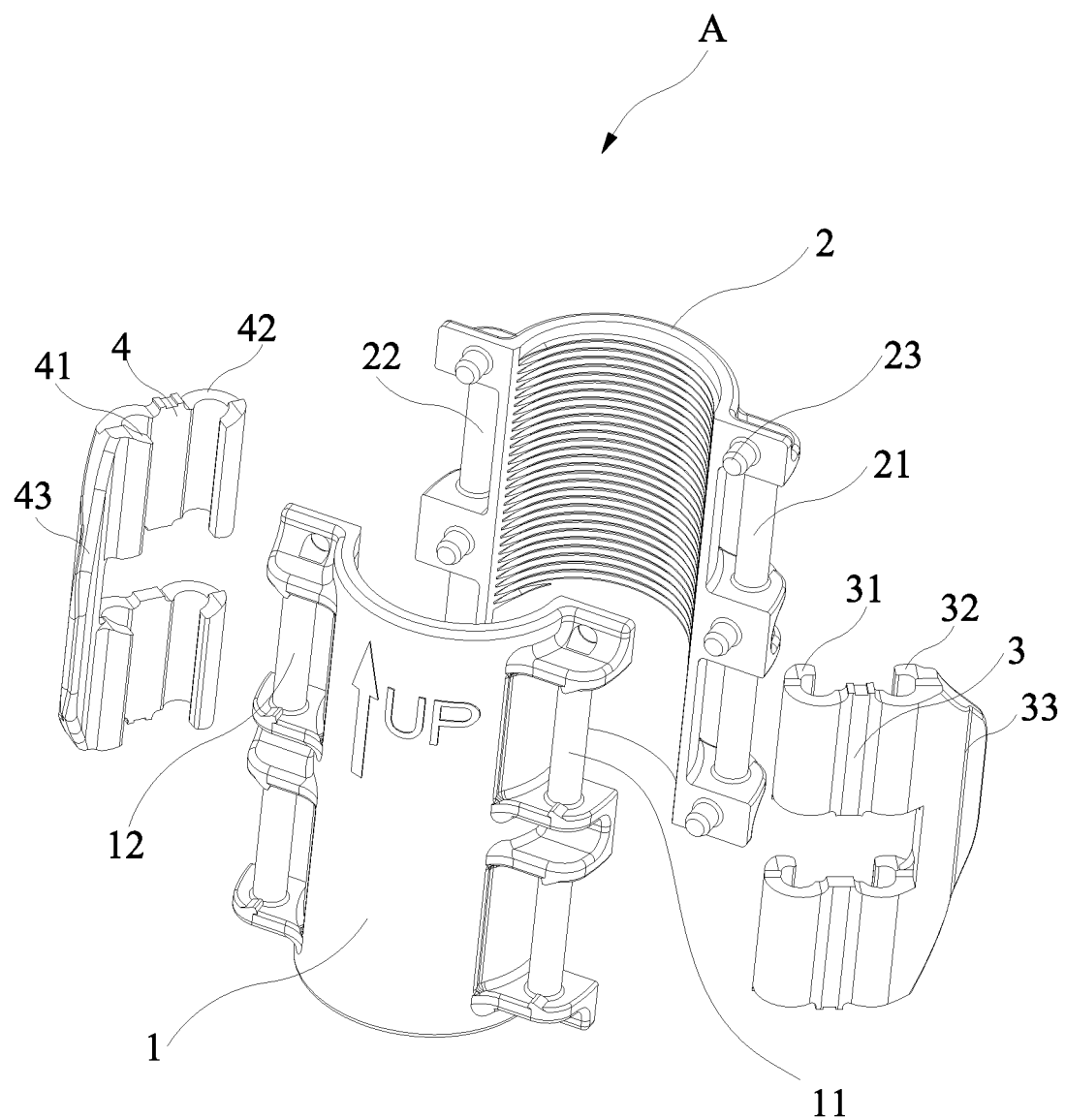
FIG. 1 is an exploded view according to a first embodiment of the present invention.
Figure 2:
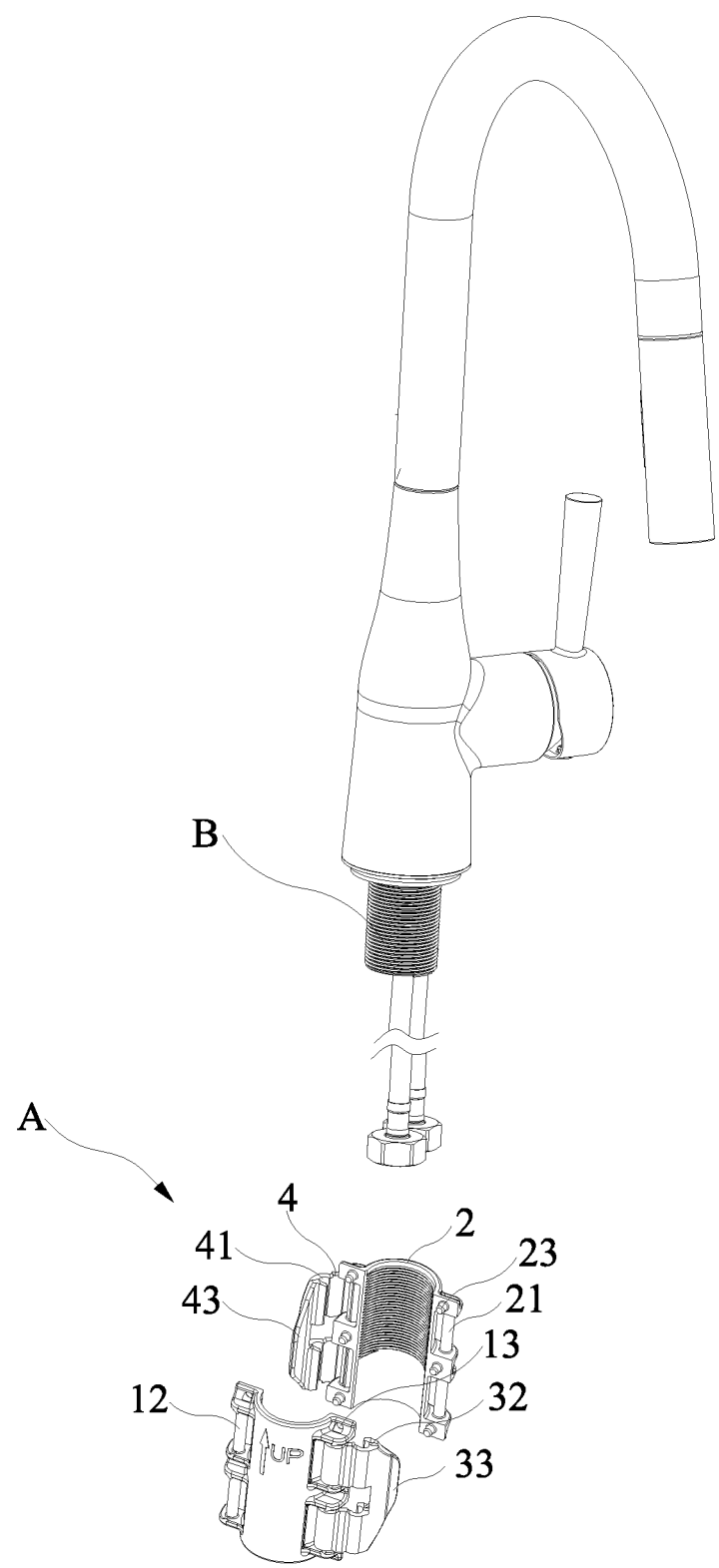
FIG. 2 is a first schematic view showing the installation of the nut body and the screw rod according to the first embodiment of the present invention.
Figure 3:
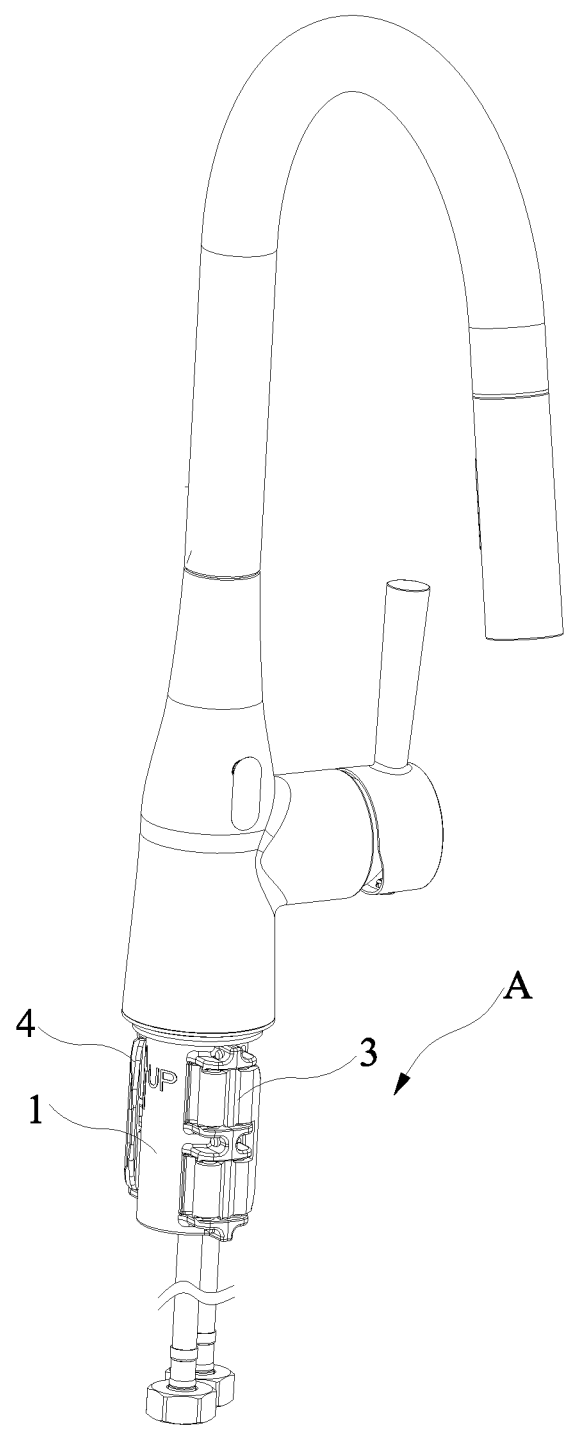
FIG. 3 is a second schematic view showing the installation of the nut body and the screw rod according to the first embodiment of the present invention.

As shown in FIGS. 1 to 3, in the first embodiment of the present invention, the quick-release and quick-installation nut comprises a nut body A. The nut body A includes a first threaded block 1 and a second threaded block 2 that are detachably connected. Both an inner wall of the first threaded block 1 and an inner wall of the second threaded block 2 are formed with inner threaded surfaces for cooperating with an outer threaded surface of a screw rod B. A right end of the first threaded block 1 is detachably connected to a right end of the second threaded block 2. A left end of the first threaded block 1 is detachably connected to a left end of the second threaded block 2. The first threaded block 1 and the second threaded block 2 are assembled and disassembled conveniently.

As shown in FIGS. 1 to 3, in the first embodiment of the present invention, the right end of the first threaded block 1 is detachably connected to the right end of the second threaded block 2 through a first connecting member 3. The right end of the first threaded block 1 is provided with a first connecting portion 11. The right end of the second threaded block 2 is provided with a second connecting portion 21. Two ends of the first connecting member 3 are respectively provided with a first elastic claw portion 31 for clasping the first connecting portion 11 and a second elastic claw portion 32 for clasping the second connecting portion 21, so that the right end of the first threaded block 1 is detachably connected to the right end of the second threaded block 2. As shown in FIGS. 1 to 3, the first elastic claw portion 31 rotatably clasps the first connecting portion 11. The first elastic claw portion 31 of the first connecting member 3 first clasps the first connecting portion 11. When it is required to connect the right end of the first threaded block 1 with the right end of the second threaded block 2, the first connecting member 3 is rotated for the second elastic claw portion 32 of the first connecting member 3 to clasp the second connecting portion 21. When it is required to disconnect the right end of the first threaded block 1 from the right end of the second threaded block 2, the first connecting member 3 is rotated reversely to disengage the second elastic claw portion 32 of the first connecting member 3 from the second connecting portion 21. As shown in FIG. 1 and FIG. 2, one end of the second elastic claw portion 32 of the first connecting member 3 is provided with a first pull piece 33. After the second elastic claw portion 32 clasps the second connecting portion 21, the first pull piece 33 facilitates the user to pull the first connecting member 3 to rotate the first connecting member 3 reversely, so as to disengage the right end of the first threaded block 1 from the right end of the second threaded block 2. It should be noted that the present invention is not limited to that the first connecting portion 11 is disposed on the right end of the first threaded block 1 and the second connecting portion 21 is disposed on the right end of the second threaded block 2. It is realizable that the first connecting portion 11 is disposed on the right end of the second threaded block 2 and the second connecting portion 21 is disposed on the right end of the first threaded block 1. In this way, the right end of the first threaded block 1 and the right end of the second threaded block 2 can also be detachably connected by the first connecting member 3.

As shown in FIG. 1 and FIG. 2, in the first embodiment of the present invention, the left end of the first threaded block 1 is detachably connected to the left end of the second threaded block 2 through a second connecting member 4. The left end of the first threaded block 1 is provided with a first coupling portion 12. The left end of the second threaded block 2 is provided with a second coupling portion 22. Two ends of the second connecting member 4 are respectively provided with a first elastic hook portion 41 for clasping the first coupling portion 12 and a second elastic hook portion 42 for clasping the second coupling portion 22, so that the left end of the first threaded block 1 is detachably connected to the left end of the second threaded block 2. As shown in FIG. 1 and FIG. 2, the second elastic hook portion 42 rotatably clasps the second coupling portion 22. The second elastic hook portion 42 of the second connecting member 4 first clasps the second coupling portion 22. When it is required to connect the left end of the first threaded block 1 with the left end of the second threaded block 2, the second connecting member 4 is rotated for the first elastic hook portion 41 of the second connecting member 4 to clasp the first hook portion 12. When it is required to disconnect the left end of the first threaded block 1 from the left end of the second threaded block 2, the second connecting member 4 is rotated reversely to disengage the first elastic hook portion 41 of the second connecting member 4 from the first coupling portion 12. As shown in FIG. 1 and FIG. 2, one end of the first elastic hook portion 41 of the second connecting member 4 is provided with a second pull piece 43. After the first elastic hook portion 41 clasps the first coupling portion 12, the second pull piece 43 facilitates the user to pull the second connecting member 4 to rotate the second connecting member 4 reversely, so as to disengage the left end of the first threaded block 1 from the left end of the second threaded block 2. It should be noted that the present invention is not limited to the first coupling portion 12 disposed on the left end of the first threaded block 1 and the second coupling portion 22 disposed on the left end of the second threaded block 2. It is realizable that the first coupling portion 12 is disposed on the left end of the second threaded block 2 and the second coupling portion 22 is disposed on the left end of the first threaded block 1. In this way, the left end of the first threaded block 1 and the left end of the second threaded block 2 can also be detachably connected by the second connecting member 4.

As shown in FIG. 1 and FIG. 2, in the first embodiment of the present invention, the end portion of the second threaded block 2 is provided with a positioning post 23, and the end portion of the first threaded block 1 is provided with a positioning hole 13 for insertion of the positioning post 23. Through the cooperation of the positioning hole 13 and the positioning post 23, the second threaded block 2 and the first threaded block 1 are accurately butted. It should be noted that the present invention is not limited to that the positioning post 23 is provided on the end portion of the second threaded block 2 and the positioning hole 13 is provided on the end portion of the first threaded block 1. It is realizable that the positioning post 23 is provided on the end portion of the first threaded block 1 and the positioning hole 13 is provided on the end portion of the second threaded block 2, so that the second threaded block 2 can be accurately butted with the first threaded block 1.

As shown in FIG. 2 and FIG. 3, in the first embodiment of the present invention, when the nut body A and the screw rod B are to be installed, first, the first connecting member 3 and the second connecting member 4 are pulled reversely, so that the second elastic claw portion 32 of the first connecting member 3 is disengaged from the second connecting portion 21 and the first elastic hook portion 41 of the second connecting member 4 is disengaged from the first coupling portion 12. The connection between the first threaded block 1 and the second threaded block 2 is released, so that the first threaded block 1 and the second threaded block 2 of the nut body A are separated. Then, the first threaded block 1 and the second threaded block 2 are moved to both sides of the screw rod B to be locked. Next, the first connecting member 3 and the second connecting member 4 are rotated, so that the second elastic claw portion 32 of the first connecting member 3 clasps the second connecting portion 21 and the first elastic hook portion 41 of the second connecting member 4 clasps the first coupling portion 12 to connect the first threaded block 1 and the second threaded block 2. Moreover, the inner threaded surfaces of the first threaded block 1 and the second threaded block 2 are engaged with the screw rod B. At this time, as long as the nut body A is slightly turned, the nut body A and the screw rod B can be locked. The installation is very convenient.

As shown in FIG. 2 and FIG. 3, in the first embodiment of the present invention, when the nut body A and the screw rod B are to be disassembled, the first connecting member 3 and the second connecting member 4 are pulled reversely, so that the second elastic claw portion 32 of the first connecting member 3 is disengaged from the second connecting portion 21 and the first elastic hook portion 41 of the second connecting member 4 is disengaged from the first coupling portion 12. The connection between the first threaded block 1 and the second threaded block 2 is released, so that the first threaded block 1 and the second threaded block 2 of the nut body A can be separated to remove the nut body A. The disassembly is very convenient.

Second Embodiment

Figure 4:
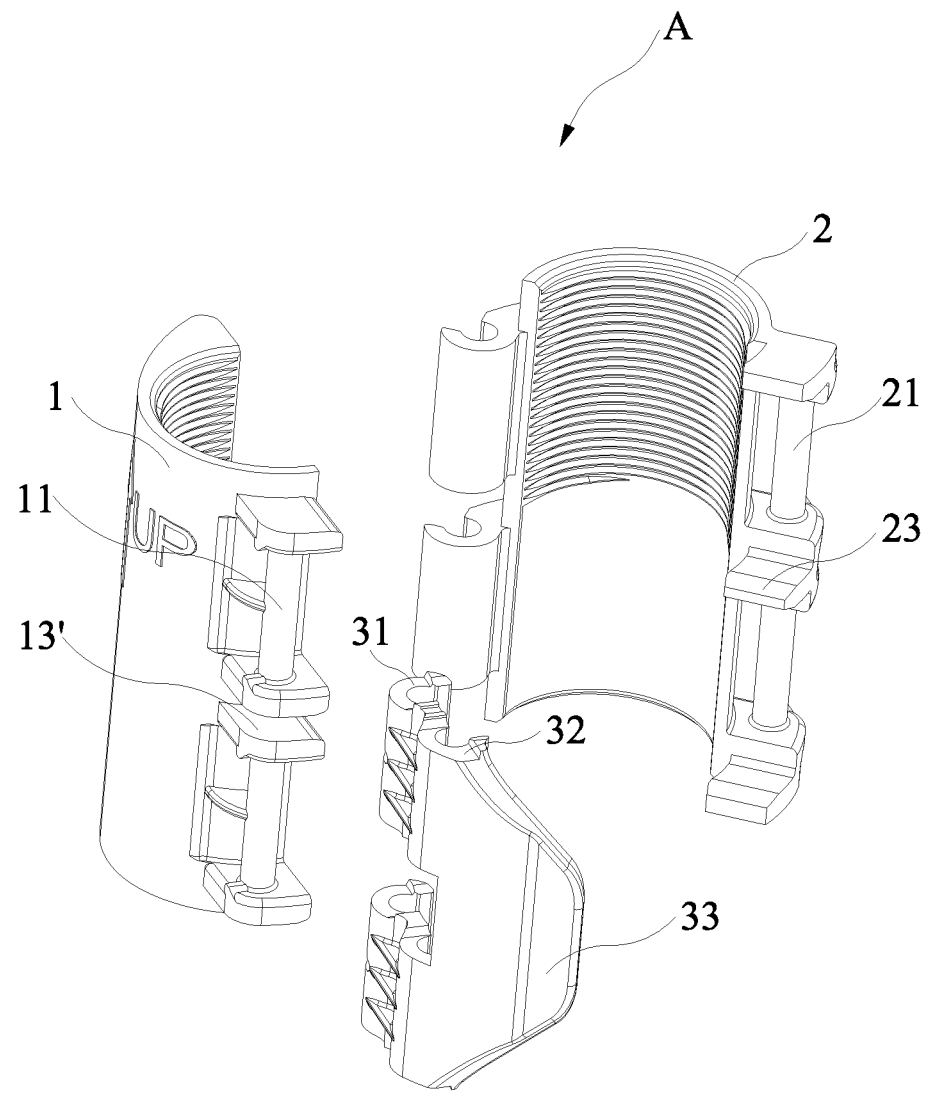
FIG. 4 is an exploded view according to a second embodiment of the present invention.
Figure 5:
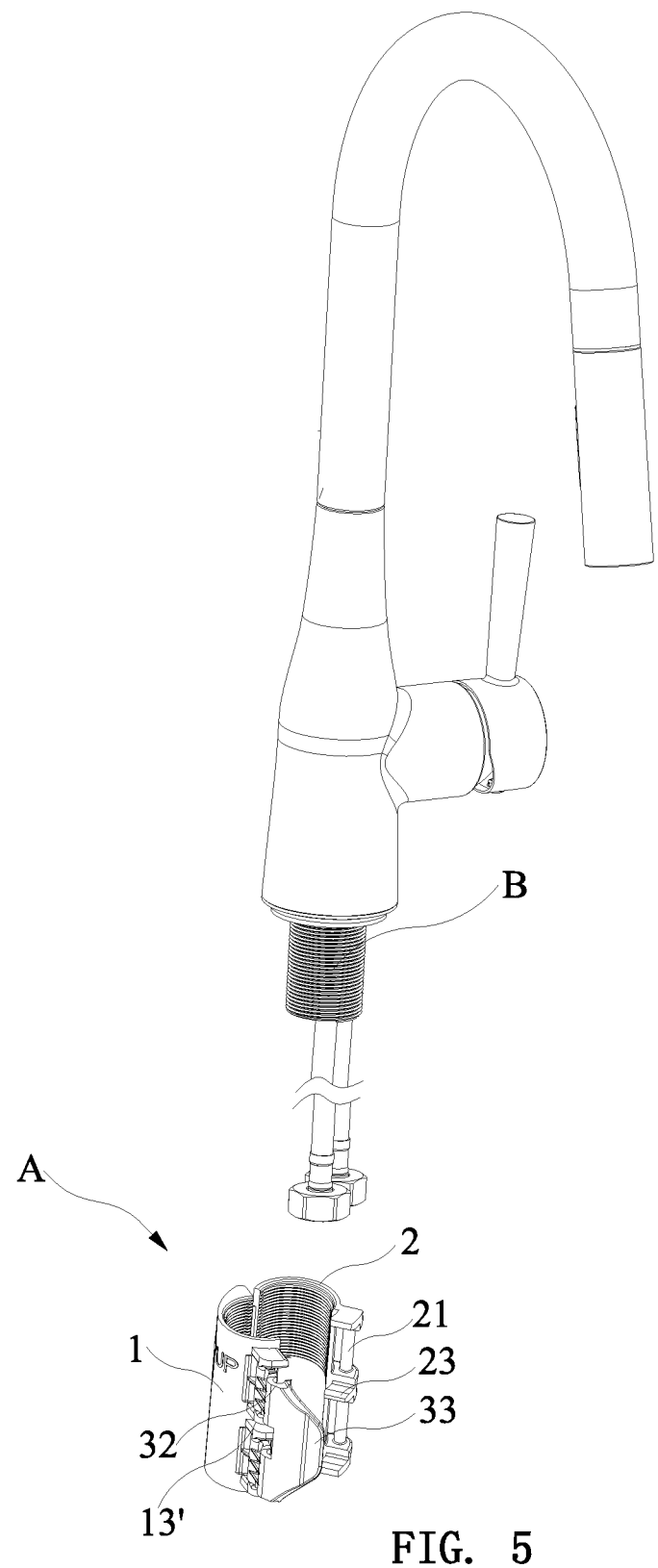
FIG. 5 is a first schematic view showing the installation of the nut body and the screw rod according to the second embodiment of the present invention.
Figure 6:
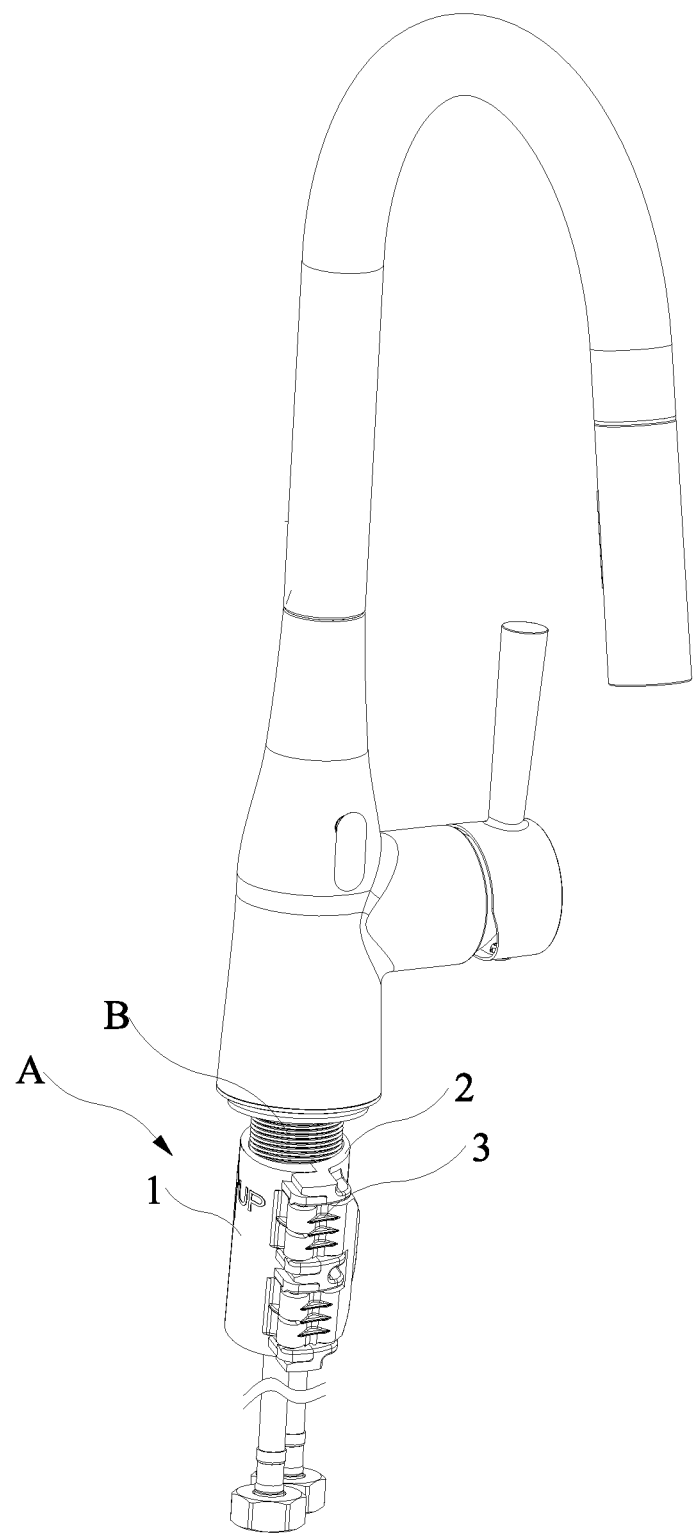
FIG. 6 is a second schematic view showing the installation of the nut body and the screw rod according to the second embodiment of the present invention.

As shown in FIGS. 4 to 6, the difference between the second embodiment and the first embodiment of the present invention is that in the second embodiment of the present invention, the right end of the first threaded block 1 and the right end of the second threaded block 2 are detachably connected, and the left end of the first threaded block 1 and the left end of the second threaded block 2 are hingedly connected. In this way, the first threaded block 1 and the second threaded block 2 of the nut body A are easily disassembled and assembled.

As shown in FIGS. 4 to 6, in the first embodiment of the present invention, the right end of the first threaded block 1 is detachably connected to the right end of the second threaded block 2 through a first connecting member 3. The right end of the first threaded block 1 is provided with a first connecting portion 11. The right end of the second threaded block 2 is provided with a second connecting portion 21. Two ends of the first connecting member 3 are respectively provided with a first elastic claw portion 31 for clasping the first connecting portion 11 and a second elastic claw portion 32 for clasping the second connecting portion 21, so that the right end of the first threaded block 1 is detachably connected to the right end of the second threaded block 2. As shown in FIGS. 4 to 6, the first elastic claw portion 31 rotatably clasps the first connecting portion 11. The first elastic claw portion 31 of the first connecting member 3 first clasps the first connecting portion 11. When it is required to connect the right end of the first threaded block 1 with the right end of the second threaded block 2, the first connecting member 3 is rotated for the second elastic claw portion 32 of the first connecting member 3 to clasp the second connecting portion 21. When it is required to disconnect the right end of the first threaded block 1 from the right end of the second threaded block 2, the first connecting member 3 is rotated reversely to disengage the second elastic claw portion 32 of the first connecting member 3 from the second connecting portion 21. As shown in FIG. 4 and FIG. 5, one end of the second elastic claw portion 32 of the first connecting member 3 is provided with a first pull piece 33. After the second elastic claw portion 32 clasps the second connecting portion 21, the first pull piece 33 facilitates the user to pull the first connecting member 3 to rotate the first connecting member 3 reversely, so as to disengage the right end of the first threaded block 1 from the right end of the second threaded block 2. It should be noted that the present invention is not limited to the first connecting portion 11 disposed on the right end of the first threaded block 1 and the second connecting portion 21 disposed on the right end of the second threaded block 2. It is realizable that the first connecting portion 11 is disposed on the right end of the second threaded block 2 and the second connecting portion 21 is disposed on the right end of the first threaded block 1. In this way, the right end of the first threaded block 1 and the right end of the second threaded block 2 can also be detachably connected by the first connecting member 3.

As shown in FIG. 4 and FIG. 5, in the second embodiment of the present invention, the end portion of the second threaded block 2 is provided with a positioning post 23, and the end portion of the first threaded block 1 is provided with a positioning groove 13' for insertion of the positioning post 23. Through the cooperation of the positioning groove 13' and the positioning post 23, the second threaded block 2 and the first threaded block 1 are accurately butted. It should be noted that the present invention is not limited to that the positioning post 23 is provided on the end portion of the second threaded block 2 and the positioning groove 13' is provided on the end portion of the first threaded block 1. It is realizable that the positioning post 23 is provided on the end portion of the first threaded block 1 and the positioning groove 13' is provided on the end portion of the second threaded block 2, so that the second threaded block 2 can be accurately butted with the first threaded block 1.

As shown in FIG. 5 and FIG. 6, in the second embodiment of the present invention, when the nut body A and the screw rod B are to be installed, first, the first connecting member 3 is pulled reversely, so that the second elastic claw portion 32 of the first connecting member 3 is disengaged from the second connecting portion 21. The connection between the right end the first threaded block 1 and the right end of the second threaded block 2 is released, so that the first threaded block 1 and the second threaded block 2 of the nut body A are separated. Then, the first threaded block 1 and the second threaded block 2 are moved to both sides of the screw rod B to be locked. Next, the first connecting member 3 is rotated, so that the second elastic claw portion 32 of the first connecting member 3 clasps the second connecting portion 21 to connect the first threaded block 1 and the second threaded block 2. Moreover, the inner threaded surfaces of the first threaded block 1 and the second threaded block 2 are engaged with the screw rod B. At this time, as long as the nut body A is slightly turned, the nut body A and the screw rod B can be locked. The installation is very convenient.

As shown in FIG. 5 and FIG. 6, in the second embodiment of the present invention, when the nut body A and the screw rod B are to be disassembled, the first connecting member 3 is pulled reversely, so that the second elastic claw portion 32 of the first connecting member 3 is disengaged from the second connecting portion 21. The connection between the right end of the first threaded block 1 and the right end of the second threaded block 2 is released, so that the first threaded block 1 and the second threaded block 2 of the nut body A can be separated to remove the nut body A. The disassembly is very convenient.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A quick-release and quick-installation nut used for cooperating with a screw rod, comprising a nut body, the nut body including a first threaded block and a second threaded block, an inner wall of the first threaded block and an inner wall of the second threaded block being formed with inner threaded surfaces for cooperating with an outer threaded surface of the screw rod; a right end of the first threaded block being detachably connected to a right end of the second threaded block;

the right end of the first threaded block is detachably connected to the right end of the second threaded block through a first connecting member; one of the right end of the first threaded block and the right end of the second threaded block is provided with a first connecting portion, another one of the right end of the first threaded block and the right end of the second threaded block is provided with a second connecting portion; two ends of the first connecting member are provided with a first elastic claw portion and a second elastic claw portion respectively, the first elastic claw portion rotatably clasps the first connecting portion; the first connecting member rotates about the first connecting portion towards a first direction so that the second elastic claw portion clasps the second connecting portion, and the first connecting member rotates about the first connecting portion towards a second direction opposite to said first direction so that the second elastic claw portion is disengaged from the second connecting portion;

a left end of the first threaded block is detachably connected to a left end of the second threaded block through a second connecting member; one of the left end of the first threaded block and the left end of the second threaded block is provided with a first coupling portion, another one of the left end of the first threaded block and the left end of the second threaded block is provided with a second coupling portion; two ends of the second connecting member are provided with a first elastic hook portion and a second elastic hook portion respectively; the second elastic hook portion rotatably clasps the second coupling portion; the second connecting member rotates about the second coupling portion towards a first direction so that the first elastic hook portion clasps the first coupling portion, and the second connecting member rotates about the second coupling portion towards a second direction opposite to said first direction so that the first elastic hook portion is disengaged from the first coupling portion.

2. The quick-release and quick-installation nut as claimed in claim 1, wherein one end of the second elastic claw portion of the first connecting member is provided with a first pull piece.

3. The quick-release and quick-installation nut as claimed in claim 2, wherein one end of the first elastic hook portion of the second connecting member is provided with a second pull piece.

* * * * *